(12) United States Patent
Kim

(10) Patent No.: US 8,684,612 B2
(45) Date of Patent: Apr. 1, 2014

(54) OPTICAL FRAME ATTACHED WITH ALIGNMENT FEATURES MICROFABRICATED IN DIE

(75) Inventor: Brian H. Kim, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 311 days.

(21) Appl. No.: 13/175,579

(22) Filed: Jul. 1, 2011

(65) Prior Publication Data

US 2013/0004167 A1    Jan. 3, 2013

(51) Int. Cl.
*G02B 6/36* (2006.01)

(52) U.S. Cl.
USPC .................. 385/93; 385/15; 385/24; 385/88; 385/92; 385/94

(58) Field of Classification Search
USPC .................. 385/15, 24, 53, 88, 92, 93, 94
See application file for complete search history.

(56) References Cited

U.S. PATENT DOCUMENTS

| 4,670,770 A | 6/1987 | Tai | |
|---|---|---|---|
| 6,118,917 A * | 9/2000 | Lee et al. | 385/49 |
| 7,952,705 B2 * | 5/2011 | Shen et al. | 356/246 |
| 2003/0133668 A1 | 7/2003 | Wagner et al. | |
| 2008/0044141 A1 | 2/2008 | Willis et al. | |
| 2011/0123151 A1 | 5/2011 | Zbinden et al. | |

OTHER PUBLICATIONS

International Search Report and Written Opinion for International Application No. PCT/US2012/045304 dated Dec. 28, 2012, Whole Document.

* cited by examiner

*Primary Examiner* — Jennifer Doan

(74) *Attorney, Agent, or Firm* — Blakely, Sokoloff, Taylor & Zafman LLP

(57) ABSTRACT

A photonic device assembly including a photonic device fabricated on a chip substrate, the chip substrate having a physical alignment feature fabricated therein, and a frame to couple an external optical lens or interconnect to the photonic device. The frame has a frame facet abutted to a complementary facet of the physical alignment feature. An adhesive permanently affixes the frame to the photonic device as aligned by the abutted facets. A method of forming a photonic device assembly includes microfabricating a physical alignment feature in a chip substrate of a photonic device and joining a frame to the chip substrate by abutting a facet of the coupling to a complementary facet of the fabricated physical alignment feature.

16 Claims, 9 Drawing Sheets

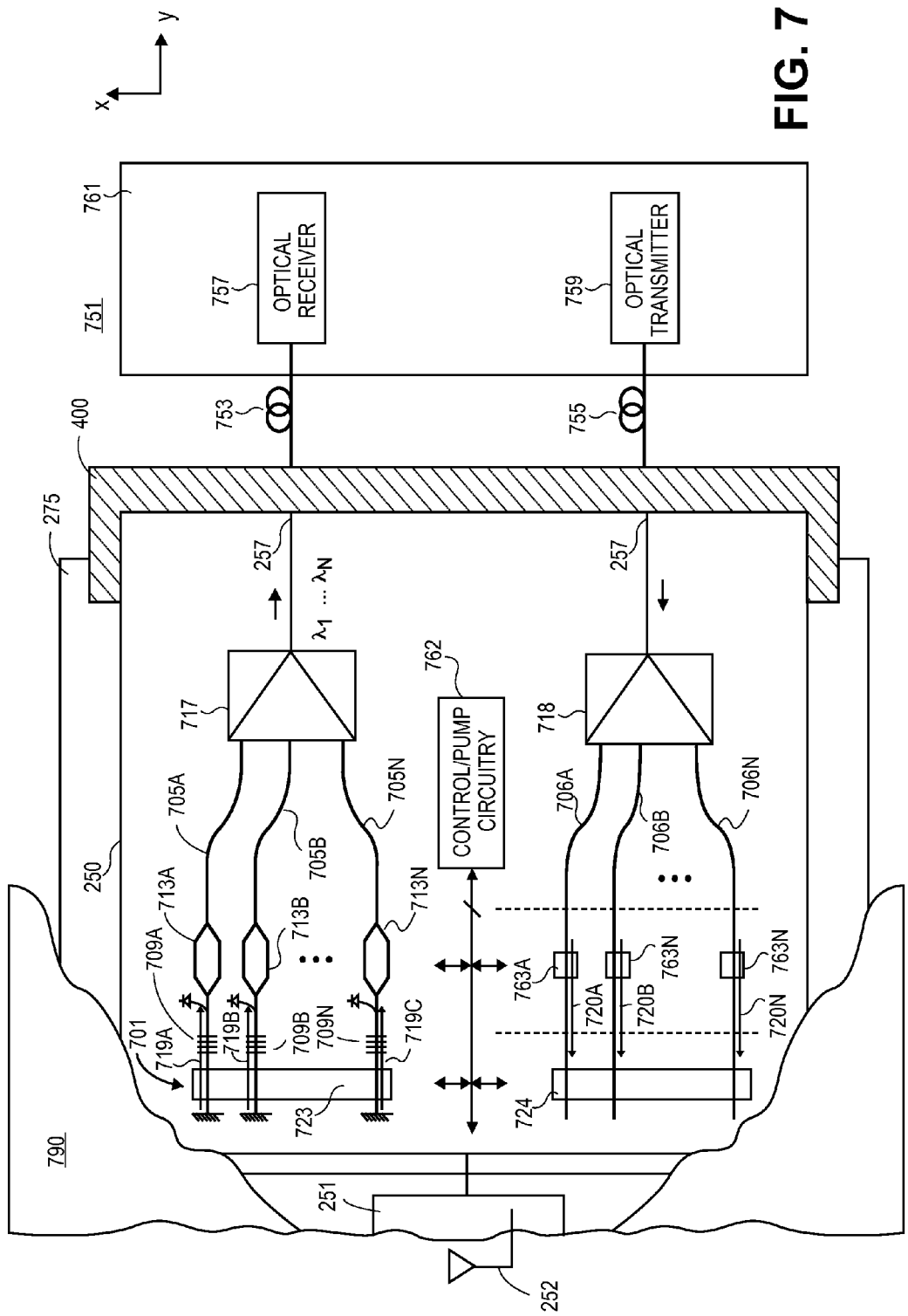

OPTICAL FRAME ATTACHED WITH ALIGNMENT FEATURES MICROFABRICATED IN DIE

TECHNICAL FIELD

Embodiments of the present invention are in the field of monolithically integrated optical components (IOC) and more specifically pertain to attachment of an optical frame to an chip or die for coupling an external optical interconnect to the chip.

BACKGROUND

Communications networks continue to grow in breadth of coverage and data density. An important enabling technology of this continued growth is increased integration of optical (photonic) components. For example, metropolitan area networks and wide area networks are now being deployed with wavelength division multiplexing (WDM) which add/drop channels using wavelength selective filters integrated onto silicon, or other semiconductor, substrates using very large scale integration (VLSI) manufacturing techniques.

In certain applications, for example where an IOC chip is an optical transceiver, a lens or other optical interconnect (e.g., optical fiber) is mechanically assembled onto an IOC chip. Once the lens is attached, a jumper connector or similar mechanical coupling may be attached to create an optical link, for example with optical fibers.

Component placement, bonding, lens alignment and attachment are time-consuming and cumbersome processes, each associated with a manufacturing tolerance. For example, in one conventional method, an IOC chip is placed on a substrate and then, using a pick and place machine with a visual aligning system, the mechanical coupling is aligned and placed on the chip.

With conventional assembly techniques, there are significant amounts of positional deviation (e.g., tolerance stack) between the mechanical coupling and the IOC chip. Positional deviation can induce performance issues and even render a packaged IOC inoperable, requiring rework or scrap of the photonic device assembly. For both techniques, alignment frame variation, placing capability (IOC chip and/or alignment frame), and mechanical coupling variation all contribute to the positional deviation.

BRIEF DESCRIPTION OF THE DRAWINGS

Embodiments of the present invention are illustrated by way of example, and not limitation, in the figures of the accompanying drawings in which:

FIG. 7 is a plan view of a system employing an IOC chip attached to the optical frame illustrated in FIG. 4, in accordance with an embodiment;

DETAILED DESCRIPTION

Figure 1:
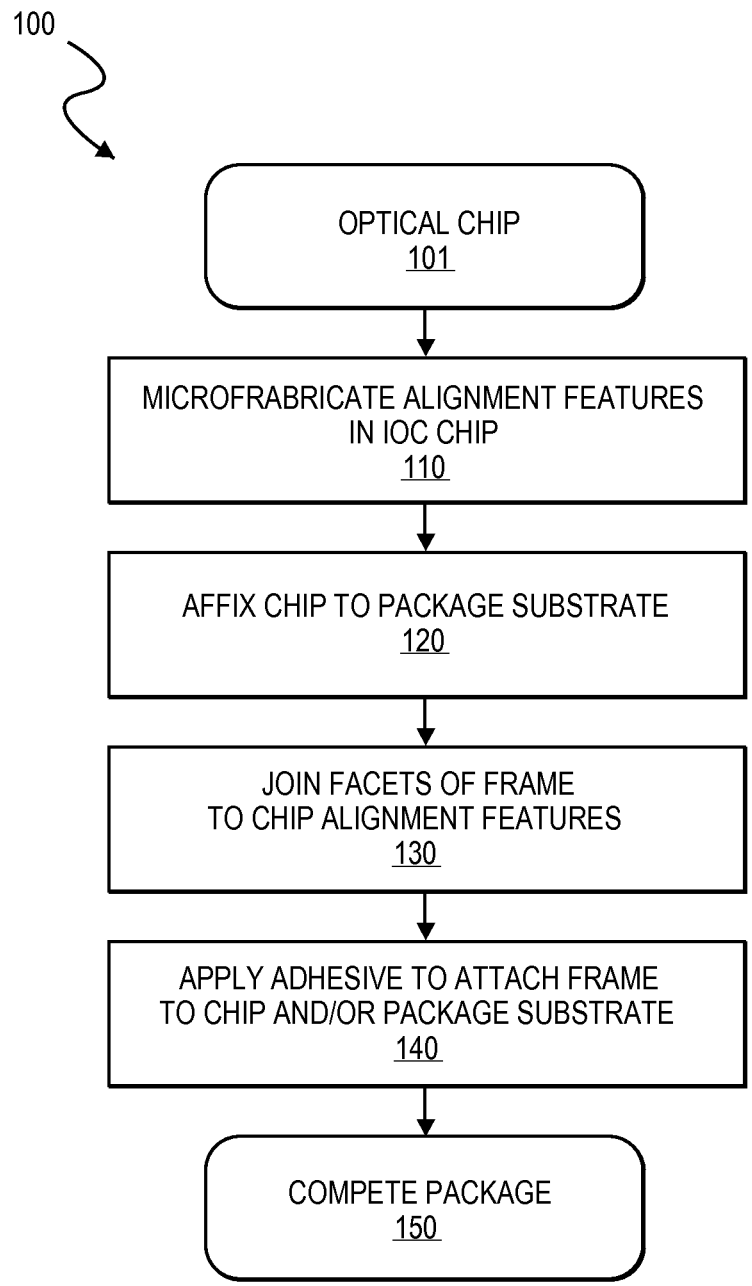
FIG. 1 is a flow diagram of a method of attaching an optical frame to an IOC chip, in accordance with an embodiment.

Optical frames and methods of attaching optical frames to an IOC chip having microfabricated alignment features thereon, are described. In the following description, numerous specific details are set forth, such as materials and processing techniques to describe exemplary embodiments of the present invention. However, it will be apparent to one skilled in the art that embodiments of the present invention may be practiced without these specific details. In other instances, well-known aspects, such as IOC chip fabrication, substrate thinning, bumping, packaging etc., are not described in detail to avoid unnecessarily obscuring embodiments of the present invention. Reference throughout this specification to "an embodiment" means that a particular feature, structure, material, or characteristic described in connection with the embodiment is included in at least one embodiment of the invention. Thus, the appearances of the phrase "in an embodiment" in various places throughout this specification are not necessarily referring to the same embodiment of the invention. Furthermore, the particular features, structures, materials, or characteristics may be combined in any suitable manner in one or more embodiments. Also, it is to be understood that the various exemplary embodiments shown in the figures are merely illustrative representations and are not necessarily drawn to scale.

The terms "coupled" and "connected," along with their derivatives, may be used herein to describe structural relationships between components. It should be understood that these terms are not intended as synonyms for each other. Rather, in particular embodiments, "connected" may be used to indicate that two or more elements are in direct physical or electrical contact with each other. "Coupled" my be used to indicate that two or more elements are in either direct or indirect (with other intervening elements between them) physical, electrical, or optical contact with each other, and/or that the two or more elements co-operate or interact with each other (e.g., as in a cause an effect relationship).

The terms "over," "under," "between," and "on" as used herein refer to a relative position of one component with respect to other components. As such, for example, one component disposed over or under another component may be directly in contact with the other component or may have one or more intervening components. Moreover, one component disposed between two components may be directly in contact with the two components or may have one or more intervening components. In contrast, a first component "on" a second component is in contact with that second component. Additionally, the relative position of one component with respect to other components is provided assuming operations are performed relative to a reference substrate without consideration of the absolute orientation of the reference substrate.

In embodiments, a mechanical coupling, also referred to herein as an "optical frame," or simply "frame," is affixed to the IOC chip by mating facets micro machined in the IOC chip itself with complementary facets in the optical frame. Mechanical joining of the mating facets, for example as part of a chip packaging process, forms a photonic device assembly in which the frame provides an external interface to which an optical lens or optical interconnect (e.g., optical fiber) may be subsequently attached (e.g., inserted into the optical frame). The optical frame, once attached to the IOC chip, functions as a bridge to position the external optical lens or other optical interconnect in alignment to the optical device (s) fabricated in the IOC chip (e.g., a waveguide) so that a reliable optical connection may be made. As described herein, attachment of the optical frame to the IOC may be performed based on the mechanical alignment features machined into the IOC chip so that neither fiducials nor a visual alignment system is necessary and concomitant alignment error may thereby be reduced.

FIG. 1 is a flow diagram of a method 100 of attaching an optical frame to an IOC chip, in accordance with an embodiment. Generally, the method 100 is applicable to any IOC chip, including edge-coupled and vertically-coupled photonic devices. FIGS. 2A-7 illustrate an exemplary edge-coupled embodiment while FIGS. 8A-11 illustrate an exemplary vertically-coupled embodiment. Beginning at operation 101, an IOC chip is provided. In embodiments, the IOC chip includes any edge-coupled or vertically-coupled photonic device known in the art fabricated on any substrate commercially available. Exemplary photonic devices include one or more of: passive and active waveguides, vertical and horizontal lasers (distributed feedback (DFB), distributed Bragg reflector (DBR), etc.), photodiodes (PiN, etc.), optical modulators (Mach-Zender (MZ), etc.), optical add-drop multiplexer (OADM), and the like. Exemplary chip substrates include, but are not limited to, a group IV-based material such as, but not limited to, monocrystalline silicon, germanium or silicon/germanium, a III-V material such as GaAs on InP, or a hybrid epitaxial structure including a group IV and/or group III-V grown, bonded, or otherwise affixed on a handling substrate such as sapphire, glass, polymer, etc.

Figure 2A:
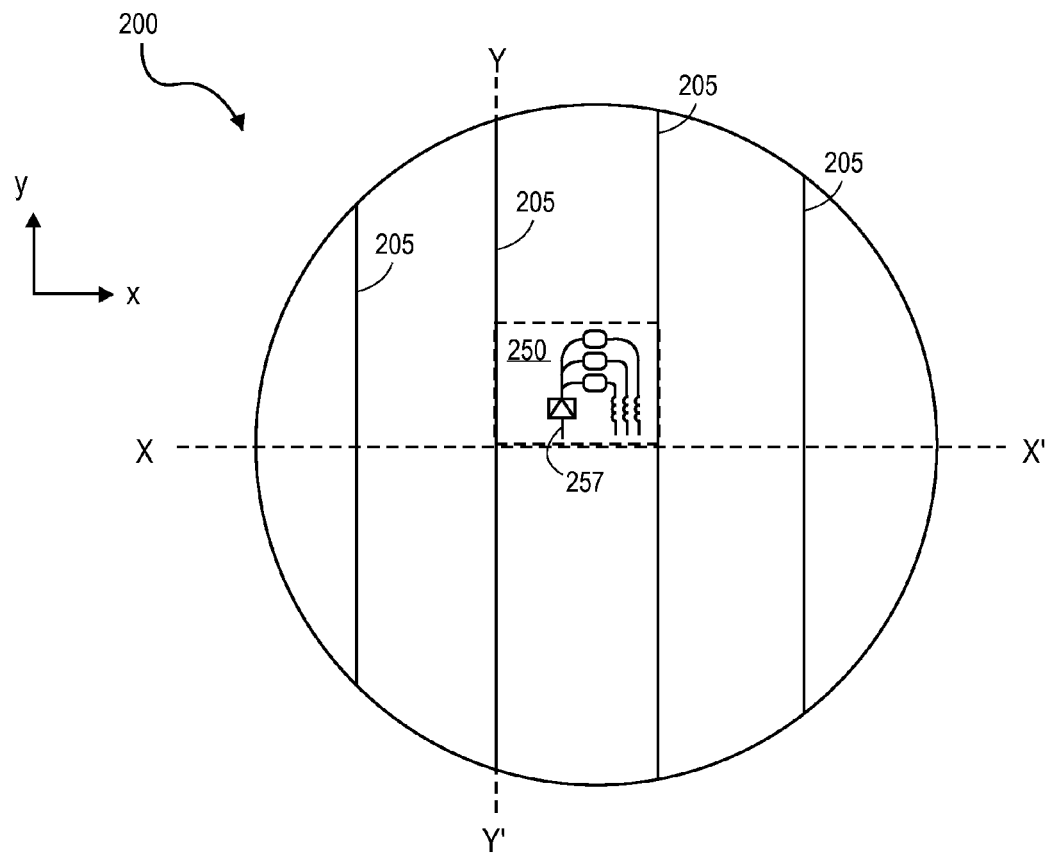
FIG. 2A is a plan view of a substrate including a plurality of IOC chips into which alignment features are microfabricated, in accordance with an embodiment.
Figure 2B:
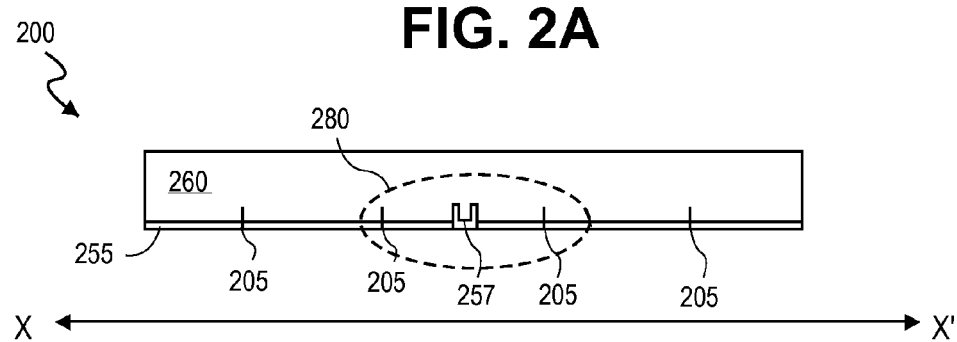
FIG. 2B is a cross-sectional view of the substrate illustrated in FIG. 2A, in accordance with an embodiment.

At operation 110, alignment features are microfabricated in the chip substrate. Such alignment features may be fabricated at the chip level, but are advantageously formed at the wafer-level to a plurality of IOC chips simultaneously as a backend operation preceding, or part of, chip substrate dicing. FIG. 2A is a plan view of a wafer 200 including an IOC chip 250 into which alignment features 205 are microfabricated prior to dicing, in accordance with an embodiment. FIG. 2B is a cross-sectional view of the substrate illustrated in FIG. 2A along the X-X' line.

In embodiments, alignment features are formed in the chip substrate. As illustrated in FIGS. 2A and 2B, the wafer 200 contains a plurality of IOC chips with the illustrated IOC chip 250 including an edge-coupled waveguide 257 formed on a device layer-side of the chip substrate 260. Distinction between the device layer 255 and chip substrate 260 is of little significance to the present invention with designation of the device layer 255 identified herein merely as a convenient frame of reference for the reader. In the illustrated embodiment, the alignment features 205 are formed in the chip substrate 260 on the side of the device layer 255 though in other embodiments alignment features are formed on a backside of the chip substrate 260 (opposite the device layer 255) and may further be formed through an entire thickness of the chip substrate 260 (as illustrated by the vertically-coupled embodiments).

In an embodiment, the alignment features formed at operation 110 generate at least two facets to mechanically align a mating service of a frame in at least one dimension. In the embodiment illustrated in FIG. 2A, the alignment features 205 are grooves running along the Y dimension and as such are to provide mechanical alignment in at least the X-dimension. In other embodiments, the alignment features 205 provide for mechanical alignment in at least a second dimension (Y or Z dimensions). For example, the alignment features 205A, B illustrated in FIG. 8A and further described elsewhere herein are to provide mechanical alignment in both X and Y dimensions with a separate facet(s) providing mechanical alignment in the third (Z) dimension.

Figure 2C:
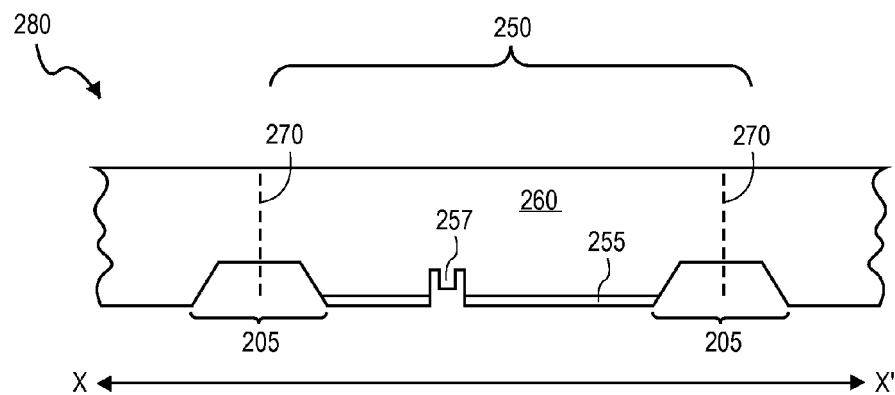
FIG. 2C is an expanded cross-sectional view of one IOC chip illustrated in FIG. 2B.

In an embodiment, the alignment features are microfabricated coincident with a scribe line. For example, in FIG. 2A, the X-X' line represents a first scribe line (intersecting the edge-coupled waveguide 257) and the Y-Y' line represents an orthogonal second scribe line for singulating two sides of the IOC chip 250 from adjacent chips coincident with an alignment feature 205. FIG. 2C is an expanded cross-sectional view 280 taken along the X-X' line within the region 280 circled in FIG. 2B. As shown, the alignment features 205 microfabricated into the chip substrate 260 are coincident, or disposed in-line with, scribe lines 270 (parallel to the Y-Y' lines in FIG. 2A). As such, fabrication of the alignment features may be done as a first portion of a scribing process (e.g., with a dicing saw). Alternatively, subsequent scribing process may be performed in alignment with the pattern formed by the alignment features, to generate an alignment facet on both the IOC chip 250 and an adjacent chip.

In an embodiment, the first and second alignment features are fabricated into the chip substrate at opposite ends of the IOC chip. As illustrated in FIG. 2C, adjacent scribe lines 270 define opposite ends of the chip substrate 260 in the X dimension. In one embodiment, the alignment features 205 are fabricated with a dicing blade. Other microfabrication techniques, such as, but not limited to, plasma etch, and wet chemical etch may also be employed in addition to, or in alternative to, sawing. For example, for an embodiment where the chip substrate 260 is silicon, any deep silicon plasma etch known in the art ($SF_6$-based, etc.) may be employed to form trenches or grooves in the silicon. Depending on the embodiment, the first and second alignment features are fabricated in alignment with features in the device layer 255 so there is minimal alignment error between the alignment features 205 and the photonic device. For example in one embodiment, the first and second ones of the alignment features 205 are fabricated with an etch mask aligned to the edge-coupled waveguide 257. As another example, the alignment features 205 are align to the edge-coupled waveguide 257 by an optical alignment performed during a street sawing process. Alternatively, the first and second ones of the alignment features 205 are fabricated with a same mask and etch process employed to fabricate the edge-coupled waveguide 257.

Figure 3A:
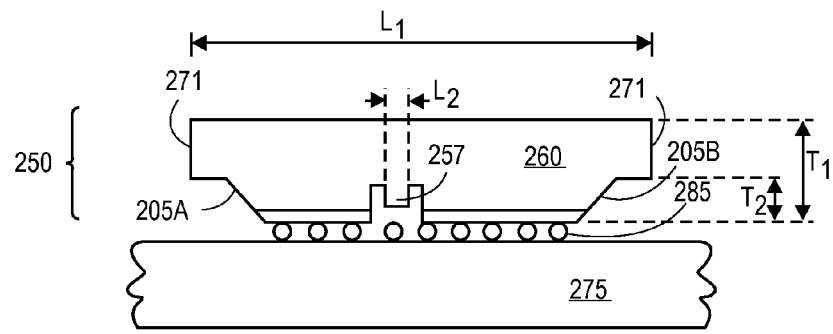
FIGS. 3A and 3B are cross-sectional views of representative operations in the method illustrated in FIG. 1, in accordance with an embodiment.
Figure 3B:
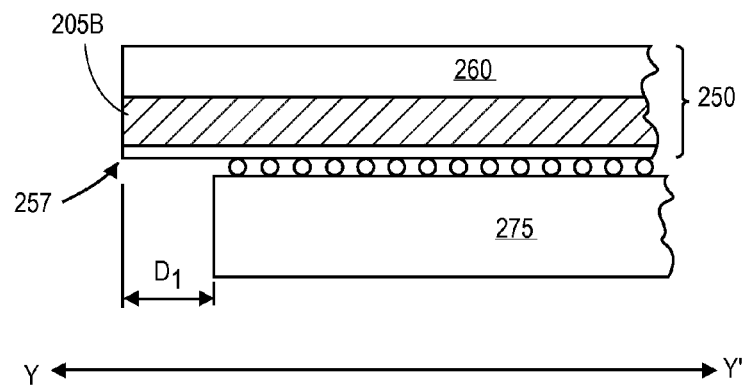

FIGS. 3A and 3B are cross-sectional views illustrating the singulated IOC chip 250. As shown, the first and second alignment features 205 are bifurcated by a dicing process to form first and second sidewall facets, 205A and 205B, disposed on opposing edges 271 of the chip substrate 260. Though a singulated chip may have nearly any dimension, as an example the opposing edges 271 are separated by a chip length $L_1$ that is on the order of 4-6 mm. An exemplary edge-coupled waveguide 257 has a width $L_2$ of between 0.3 and 25 μm (and a rib height between approximately 0.2 μm and 20 μm) with an array of such waveguides spanning a width $L_2$ of 250 μm, or more. The depth of the alignment features 205, and therefore the depth $T_2$ of the sidewall facets, 205A and 205B, may vary widely with implementation and substrate thickness. Thickness $T_1$ of the chip substrate 260, for example may be between 0.1 mm (100 μm) and 0.5 mm with the alignment features 205 ranging from 25-30% of $T_1$ to a through via/trench. In the exemplary embodiment illustrated in FIG. 3A, $T_1$ is between 0.35 mm and 0.5 mm while $T_2$ is between about 0.1 mm and 0.35 mm.

For certain embodiments where the alignment features 205 are v-grooves, the sidewall facets, 205A and 205B are sloped or angled away from each other to be non-orthogonal to the nominally planar surface of the device layer 255. As described elsewhere herein, opposing sloped/angled sidewall facets advantageously provide a means of mechanically aligning to the IOC chip 250 (i.e., to the waveguide 257). In certain such embodiments, the opposing edges 271 below the v-groove are substantially orthogonal to the device layer 255. The sidewall facets, 205A and 205B may be angled away from the device layer 255 (i.e., a positive, non-reentrant slope) by between 30 and 60 degrees (e.g., 45 degrees being the exemplary embodiment). In the exemplary embodiment, a scribing saw with a v-groove blade is utilized. Alternatively, any of the many plasma etch processes, wet chemical etch processes, etc. known in the art to be capable of sloped or angled sidewalls for a given substrate material may be utilized.

Returning to FIG. 1, at operation 120, the IOC chip is assembled onto a package substrate. For example, as further shown in FIGS. 3A and 3B, the singulated IOC chip 250 is disposed on a package substrate 275 with a ball grid array (BGA) 285 forming electrical coupling between the device layer 255 and the package substrate 275. In the exemplary embodiment, the device layer including the edge-coupled waveguide 257 is facing the package substrate 275 as in a conventional C4 or flip-chip type configuration. Alternatively, for example in a wire bonding package technology, the edge-coupled waveguide 257 may be on a surface opposite that facing the package substrate 275. Alignment of the IOC chip 250 to the package substrate 275 may be performed in any manner known in the art.

In embodiments, the IOC chip is assembled onto a package substrate with the IOC chip overhanging the package substrate so that the first and second sidewall facets extend beyond an edge of the package substrate. As illustrated in FIG. 3B, along the Y dimension, the IOC chip 250 overhangs the package substrate 275 by an amount $D_1$. Therefore, the sidewall facets 205B and 205A (not illustrated) also overhang the package substrate 275 by $D_1$. As further shown in FIG. 3B, the edge-coupled waveguide 257 is exposed at the edge of the chip overhang.

Figure 4:
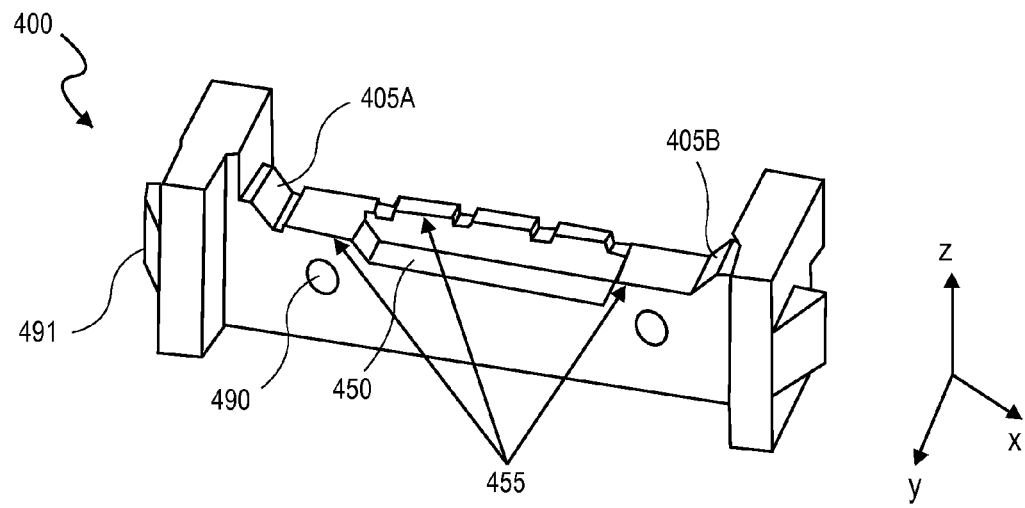
FIG. 4 is an isometric view of an optical frame, in accordance with an embodiment.

With the IOC chip assembled onto a package substrate, the optical frame is installed. Referring to FIG. 1, at operation 130, a facet of the chip alignment feature is joined to a facet to the optical frame. FIG. 4 is an isometric view of an optical frame 400, in accordance with an embodiment. Generally, the optical frame is molded or machined to having facets which are complementary to the facets fabricated into the OIC chip substrate. In one exemplary embodiment, the optical frame 400 is a plastic (e.g., injection molded). While plastic frames can be made advantageously softer than the OIC chip (e.g., silicon) so that chip breakage and particle generation is reduced, other harder materials may also be utilized for the optical frame, such as, but not limited to metals (e.g., aluminum), crystalline semiconductor materials (e.g., silicon), and glasses.

In one exemplary embodiment, the optical frame 400 includes first and second laterally opposing frame facets 405A and 405B to mate with the first and second laterally opposing sidewall facets 205A and 205B. As illustrated, the opposing frame facets 405A and 405B are angled, for example between 30 and 60 degrees from vertical and spaced apart with a maximum distance $L_3$ which is greater than the distance $L_1$ between the opposing chip edges 271. In this manner, the IOC chip 250 fits between the largest opening of opposing frame facets 405A and 405B when the optical frame 400 is displaced along the Z axis during assembly. The optical frame 400 further includes horizontal facets 455 to mechanically define a vertical (Z axis) frame standoff from the IOC chip 250. Attachment may therefore proceed by first displacing the IOC chip along the Z axis, allowing the IOC chip 250 or optical frame 400 to be displaced along the X axis by interference with the opposing frame facets 405A and 405B to center the IOC chip 250 laterality between the frame, displacing the IOC chip 250 along the Y-axis until contacting the package substrate 275, and then displacing the IOC chip 250 further along the Z-axis until contacting the horizontal facets 455.

As further illustrated in FIG. 4, additional alignment features 490 and 491 provide for subsequent mechanical alignment of a lens or optical interconnect directly to the optical frame 400. For example, angled facets 491 may provide for mechanical alignment of a lens to optical frame 400 along the X-axis as the lens is displaced along the Y-axis relative to the optical frame 400. Recesses 490 may further serve to receive complementarily protrusions in a lens or optical interconnect (jumper) to be inserted into the optical frame 400. It should be noted that the first and second laterally opposing frame facets 405A, B are open edges (rather than closed recesses like recesses 490) to avoid tensile strain of the IOC chip 250 during attachment of the optical frame 400. Recesses 490 however, pose no issue where the optical frame 400 is of a material, such as plastic, for which tensile strain of the frame is not the problem it is for a chip of a crystalline material.

Figure 5A:
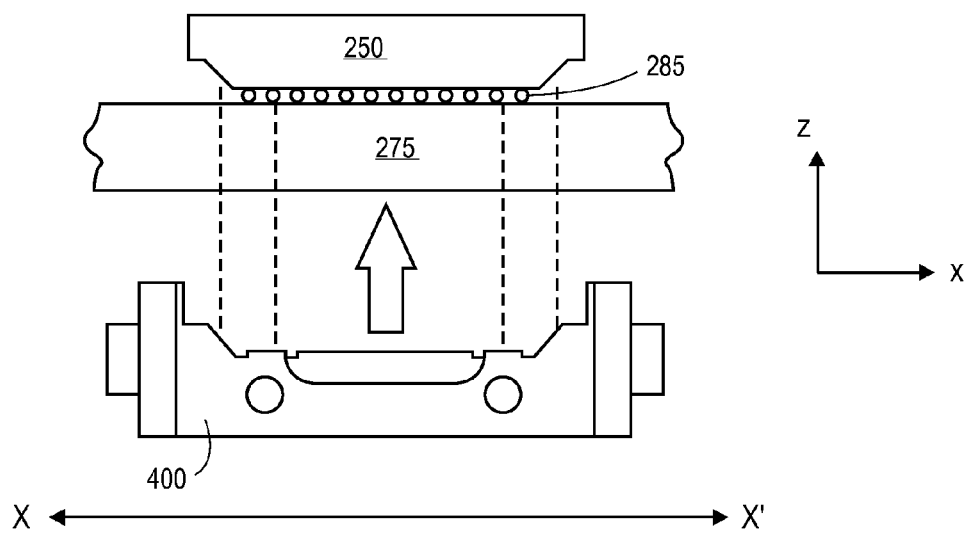
FIGS. 5A, 5B, 6A and 6B are cross-sectional views of representative operations in the method illustrated in FIG. 1 for edge mounting the optical frame illustrated in FIG. 4 an IOC chip, in accordance with an embodiment.
Figure 5B:
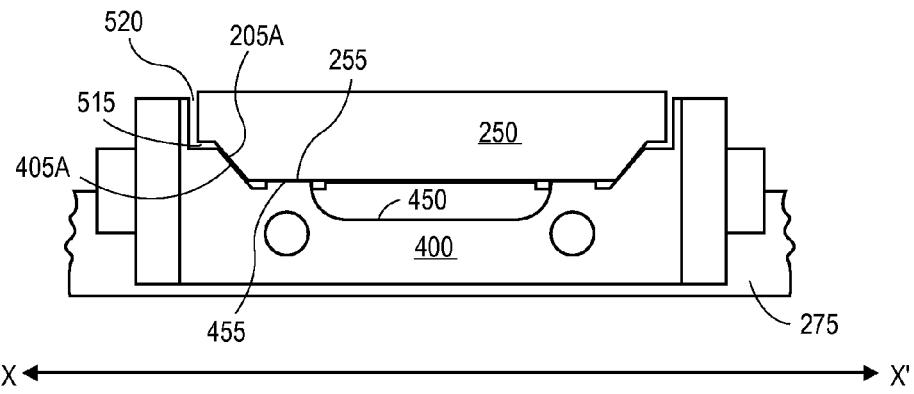

FIGS. 5A, 5B, are cross-sectional views illustrative of operation 130 to edge mount the optical frame 400 to the IOC chip 250, in accordance with an embodiment. FIG. 5A, illustrating a cross-sectional view along the X-axis, depicts laterally aligning the optical frame 400 to the chip substrate by displacing the optical frame 400 relative to the IOC chip 250 and abutting first and second laterally opposing frame facets 405A, B to the complementary (approximately parallel) first and second sidewall facets 205A, B, respectively. With the facets 205A, B recessed substantially parallel to the protrusion of opposing frame facets 405A, B, displacement of the optical frame 400 along the z-axis mechanically aligns the optical frame 400 to the IOC chip 250 along the X-axis (laterally) with a horizontal clearance 520 between the optical frame 400 and the opposing chip edges 171 set by the mechanical centering forces. As further shown in FIG. 5B, Z-axis displacement of the optical frame 400 is halted by abutting the horizontal facets 455 to the parallel surface of the device layer 255 (i.e., a vertical clearance 515 remains between IOC chip 250 and the optical frame 400 at the opposing chip edges 171). In embodiments, the horizontal facets 455 responsible for vertical alignment are spaced to avoid physical contact with photonic devices in the device layer 255. In other words, the horizontal facets 455 contact field regions disposed between the photonic devices (as laterally aligned by the first and second sidewall facets 205A, B). The edge-coupled waveguide 257, for example, may pass through a gap between horizontal facets 455.

Figure 6A:
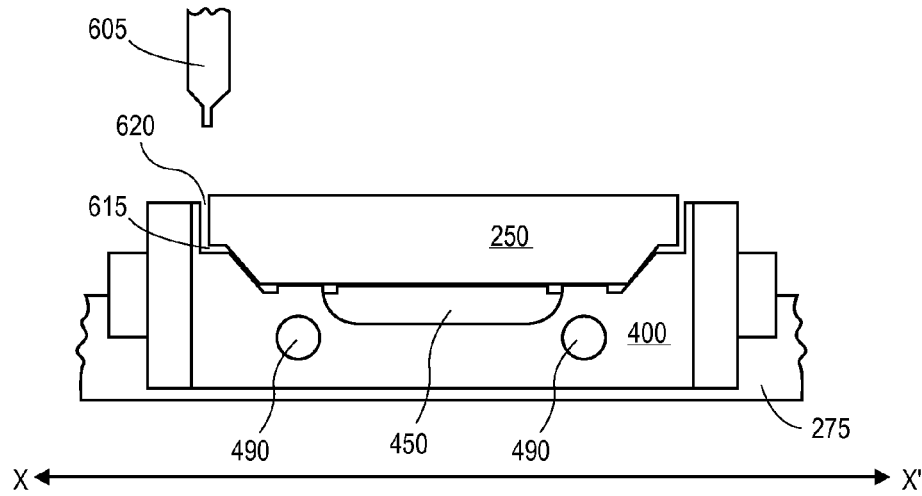
Figure 6B:
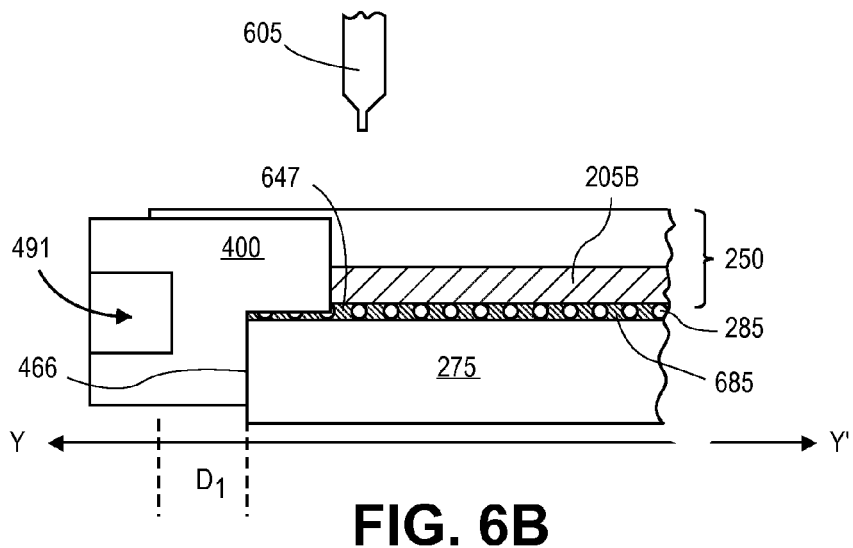

Mating of the opposing frame facets 405A, 405B and 435 therefore mechanically aligns the optical frame 400 both laterally (x-axis) and vertically (z-axis). As further shown in FIG. 6B, illustrating a cross-sectional view along the Y axis, the optical frame 400 is displaced along the Y-axis until the overhang distance $D_1$ is completely occupied by the optical frame 400 with the frame facet 466 contacting the edge of the package substrate 275 for mechanical alignment along the Y-axis. Alignment of the IOC chip 250 to the package substrate 275 at the operation 120 (FIG. 1) therefore defines one of mechanical alignment facets employed during assembly of the optical frame 400 to the IOC chip 250.

Returning to FIG. 1 with the frame mechanically aligned to the IOC chip, the method 100 proceeds with application of adhesive at operation 140 to permanently attach the frame to the photonic device in the position determined by the abutting facets. Generally, any adhesive may be used for attachment of the optical frame 400. Depending on the material of the optical frame 400 the adhesive may vary with epoxies being the exemplary embodiment for a plastic frame. As shown in FIG. 6A, the adhesive 605 is applied in the clearances 620 and 615 defined by the joined facets. In certain embodiments, as illustrated in FIG. 6B, the adhesive 605 is also applied as underfill 685 between the IOC chip 250 and the package substrate 275. As such, in one embodiment, the adhesive 605 is any conventional underfill epoxy. Relief 450 (FIG. 6A) may provide access for epoxy application at the frame facet 466 and to complete chip underfill in the region 647 between the IOC chip 250 and the package substrate 275. Due to capillary action, the adhesive 605 flows between the solder joints of the BGA 285, the clearances 615, 620 and gaps between the frame facet 466 and the package substrate 275.

Referring back to FIG. 1, after curing of the adhesive 605, the photonic device assembly is substantially complete. At operation 150, the completed package may be further processed, for example with aligning of a lens to the optical frame 400 (e.g., based on alignment features 490, 491). In certain embodiments, where the package substrate is to be soldered to a printed circuit board (PCB), the completed packaged is soldered and solder reflowed prior to attaching a lens to the optical frame 400 so as to avoid damaging the lens with a high reflow temperature (e.g., 260° C. or more).

FIG. 7 is a plan view of an optical system 751 including a platform 790 employing the IOC chip 250 attached to the optical frame 400, in accordance with an embodiment. On the IOC chip 250 is an array of electrically pumped hybrid semiconductor evanescent lasers 701 coupled to a passive semiconductor layer over, on, or in, IOC chip 250. In one embodiment, each of the lasers in the array of lasers 701 may be an electrically pumped hybrid silicon evanescent laser. In another embodiment, the laser array 701 includes either or both of a distributed Bragg reflector (DBR) and a distributed feedback (DFB) laser. In the illustrated example, the IOC chip 250 includes a plurality of optical waveguides 705A-705N over which a single bar of gain medium material 723 is bonded to create, with gratings 709A-709N, an array of lasers generating a plurality of optical beams 719A-719N in the plurality of optical waveguides 705A-705N, respectively.

The plurality of optical beams 719A-719N are modulated by modulators 713A-713N and then selected wavelengths of the plurality of optical beams 719A-719N are combined with optical add-drop multiplexer 717 to output an optical beam through the edge-coupled waveguide 257, which is coupled via the optical frame 400 to a single optical fiber 753 and out to an external sink, such as optical receiver 757.

In one embodiment, the IOC chip 250 is an optical transceiver capable of transmitting data at the multiple wavelengths over the single optical fiber 753 at speeds of more than 1 Tb/s. In the exemplary optical system 751, the IOC chip 250 may also be coupled to receive an optical beam with the edge-coupled waveguide 257 from an external source, such as the optical transmitter 759, through a single optical fiber 755 aligned to the IOC chip 250 by the optical frame 400. While the optical receiver 757 and optical transmitter 759 are also illustrated as being at a same remote location 761, it is appreciated that the optical receiver 757 and optical transmitter 759 are merely external to the platform 790 and may be provided on separate platforms, locations, etc. In the illustrated embodiment, the receiver side of the IOC chip 250 includes an optical add/drop demultiplexer 718, which splits the received optical beam into a plurality of optical beams 720A-720N. In one exemplary embodiment, the plurality of optical beams 720A-720N are split according to their respective wavelengths by one or more gratings within the optical demultiplexer 718 and are then directed through a plurality of optical waveguides 706A-706N. An array of photodetectors 763A-763N is optically coupled to the plurality of optical waveguides 706A-706N. As one example, each of the photodetectors 763A-763N is a SiGe-based photodetector or the like. In another embodiment, also shown in FIG. 7, a single bar of semiconductor material 724 may be bonded across the plurality of optical waveguides 706A-706N to form an array of photodetectors optically coupled to the plurality of optical waveguides 706A-706N. As one example, the single bar of semiconductor material 724 includes III-V semiconductor material to create III-V photodetectors. With SiGe and III-V based photodetectors optically coupled to the plurality of optical waveguides 706A-706N as shown, a variety of wavelengths for the plurality of optical beams 720A-720N may be detected.

Control/pump circuitry may also be included or integrated onto the IOC chip 250. In one embodiment where the IOC chip 250 includes a silicon layer (e.g., SOI substrate), control circuit 762 may be integrated directly in the silicon. In one example, the control circuit 762 may be electrically coupled to control, monitor and/or electrically pump any of the lasers in the multi-wavelength laser array 701, the plurality of optical modulators 713A-713N, the arrays of photodetectors (e.g., 763A-763N) or other devices or structures disposed onto the IOC chip 250.

As further illustrated in FIG. 7, the platform 790 further includes a wireless transceiver 251, for example where the platform 790 is a smart phone, tablet PC, or other mobile computing device. The wireless transceiver 251 is coupled to an antenna 252 as well as to the IOC chip 250 to enable wireless-to-optical and optical-to-wireless transceiver functionality on the single platform 790. Alternatively, the platform 790 may be configurable to independently conduct both wireless and optical communication, for example where the mobile computing device may be optically coupled to a display device through the optical coupling to the IOC chip 250 to provide content (e.g., via streaming or other known protocols) to the display and also provide wireless communication functionality (e.g., via WiFi, Bluetooth, and similarly well-known protocols).

Figure 8A:
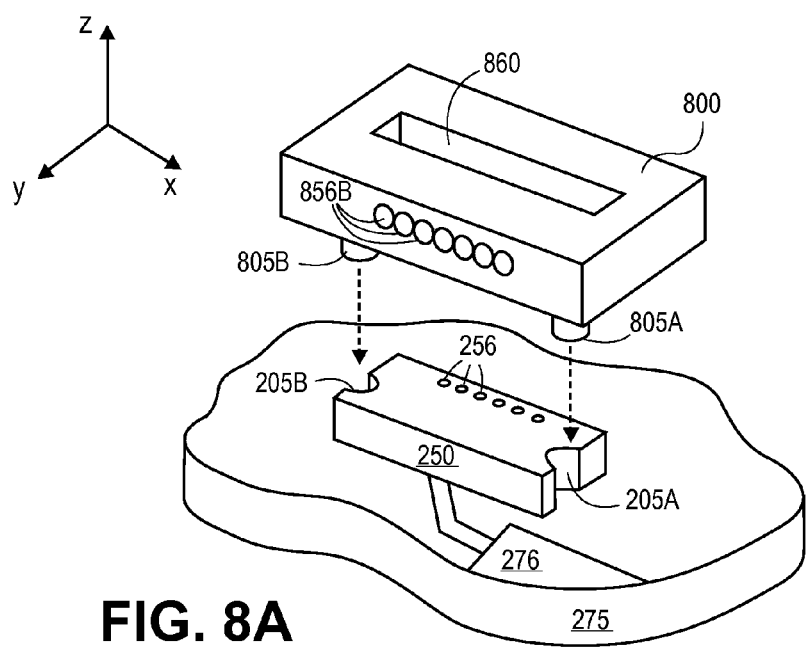
FIG. 8A is an isometric view of topside mounting of an optical frame to an IOC chip, in accordance with an embodiment.
Figure 8B:
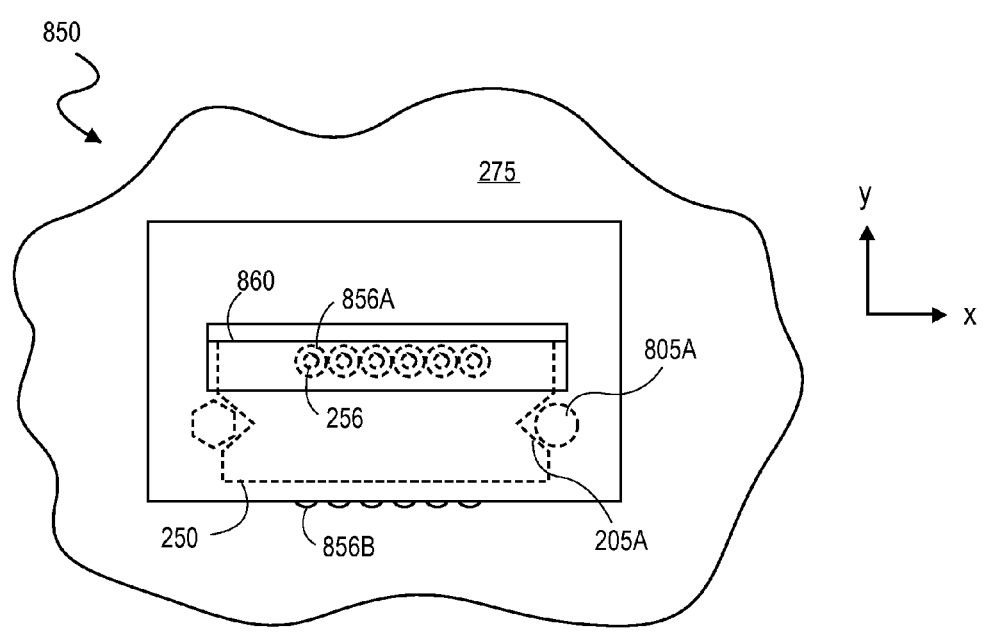
FIG. 8B is a plan view of an optical frame for topside mounting, in accordance with an embodiment.

FIGS. 8A-8B illustrate application of the method 100 to a vertically coupled IOC chip. FIG. 8A is an isometric view depicting topside mounting of an optical frame 800 to an IOC chip 250, in accordance with an embodiment. As previously described, the IOC chip 250 is attached to a package substrate 275 prior to affixing the optical frame 800. In one embodiment, the package substrate 275 is configured as a module pluggable land grid array (LGA) and may further include additional chips 276 electrically coupled to the IOC chip 250. In the vertically coupled embodiments, the IOC chip 250 includes one or more vertically-coupled photonic devices 256, such as, but not limited to, vertical cavity surface emitting lasers (VCSELs) or photodetectors.

In an embodiment, the alignment features fabricated in the IOC chip are through vias. As shown in FIG. 8A, the IOC chip 250 includes alignment features with sidewall facets 205A and 205B at opposite edges of the IOC chip 250. The sidewall facets 205A and 205B in this exemplary embodiment extend through the entire thickness of the IOC chip 250. The sidewall facets 205A, B may be fabricated substantially as described elsewhere herein, for example with features being deep reactive-ion (plasma) etched, wet chemical etched, or ultrasonic machined. In preferred embodiments, the fabricated features are bifurcated with a dicing process to open the features into the facets 205A and 205B which have a well-control pitch and allow for compressive force to be applied by the corresponding frame alignment facets 805A, B during assembly to affect mechanical alignment while avoiding tensile strains that a closed feature may induce.

Figures 9A, 9B:
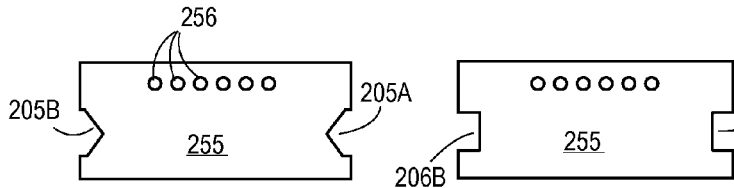
FIGS. 9A, 9B, 9C, and 9D illustrate a plurality of IOC chips having microfabricated alignment features, in accordance with an embodiment.
Figures 9C, 9D:
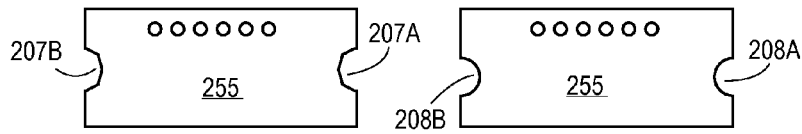

FIGS. 9A, 9B, 9C, and 9D illustrate plan view of an IOC chip with exemplary microfabricated through vias. In FIG. 9A, a through via bifurcated by the scribing process provides a first pair of intersecting facets 205A on one edge of the IOC chip and a second pair of intersecting facets 205B one an opposite edge. In FIG. 9B, the three sidewall facets 206A and 206B are formed on opposing edges of the IOC chip. In FIGS. 9C and 9D, four sidewall facets 207A, B and circular sidewall facets 208A, B are illustrated, respectively. For any of the embodiments depicted in FIGS. 9A-9D, a sidewall facet may be further angled along the z-direction to drive a lateral displacement as the optical frame 800 is displaced toward the device layer 255 of IOC chip. Alternatively, the frame alignment facets 805A, B may be angled in the z-direction (i.e., pointed) to similarly achieve an mechanical alignment in the X and/or Y dimension.

FIG. 8B is a plan view of a photonic device assembly 850 including the optical frame 800 mounted on a topside of the IOC chip 250, in accordance with an embodiment. As shown by the dashed lines, the sidewall facet 205A mates with the corresponding frame alignment facet 805A (and similarly opposing sidewall facet 205B mates with corresponding frame alignment facet 805B) to affect mechanical alignment in the x and y dimensions. Following alignment, adhesive is applied to affix the mechanically aligned frame to the IOC chip substantially as described for the edge-coupled embodiments.

As further illustrated, the optical frame 800 includes a lens 860 which provides an optical pathway between optical inputs 856A facing the vertically-coupled photonic devices 256 and optical outputs 856B non-parallel with the photonic device surface (e.g., orthogonal). It should be noted for embodiments where the lens 860 is embedded in the optical frame 800, a pluggable LGA technology advantageously avoids exposing the lens 860 to a high solder reflow temperature. Alternatively, where a solder reflow is desired after the photonic device assembly 850 is formed, the lens 860 may be fitted to the optical frame 800 using a post-assembly physical alignment to other alignment features of the optical frame 800.

Figure 10A:
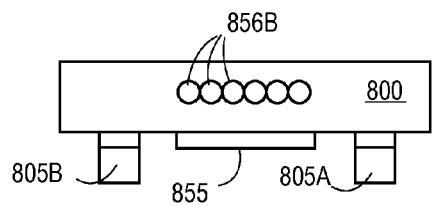
FIGS. 10A and 10B illustrate horizontal side views of the optical frame illustrated in FIG. 8A, in accordance with an embodiment.
Figure 10B:
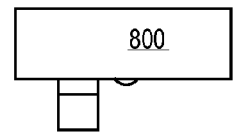
Figure 10C:
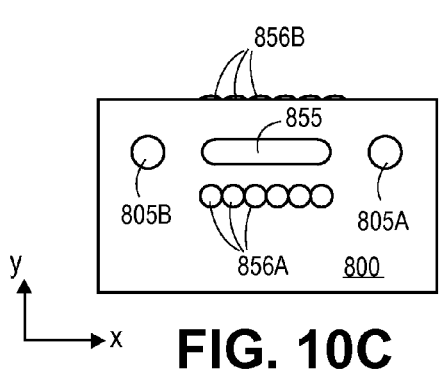
FIG. 10C is a plan view of a bottom side of the optical frame illustrated in FIGS. 10A and 10B, in accordance with an embodiment.
Figure 10D:
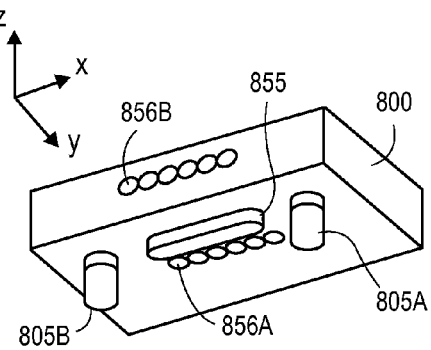
FIG. 10D is an isometric view of the optical frame illustrated in FIGS. 10A-10C, in accordance with an embodiment.

FIGS. 10A and 10B illustrate horizontal side views of the optical frame illustrated in FIGS. 8A and 8B, while FIG. 10C is a plan view of a bottom side of the optical frame 800 illustrated in FIGS. 10A and 10B in accordance with an embodiment. FIG. 10D is an isometric view of the optical frame illustrated in FIGS. 10A-10C. As shown in FIGS. 10A, 10C, and 10D, the bottom side of the optical frame 800 includes a facet 855 which is to abut with the surface of the device layer 255 to set an alignment of the optical frame 800 to the IOC chip 250 along the z-axis by defining a standoff height. As such, like the edge-coupled embodiments, at least three separate alignment facets are provided on the frame (two opposing vertical sidewall facets (805A, B) for lateral alignment and at least one horizontal alignment facet (855) for vertical alignment.

Figure 11:
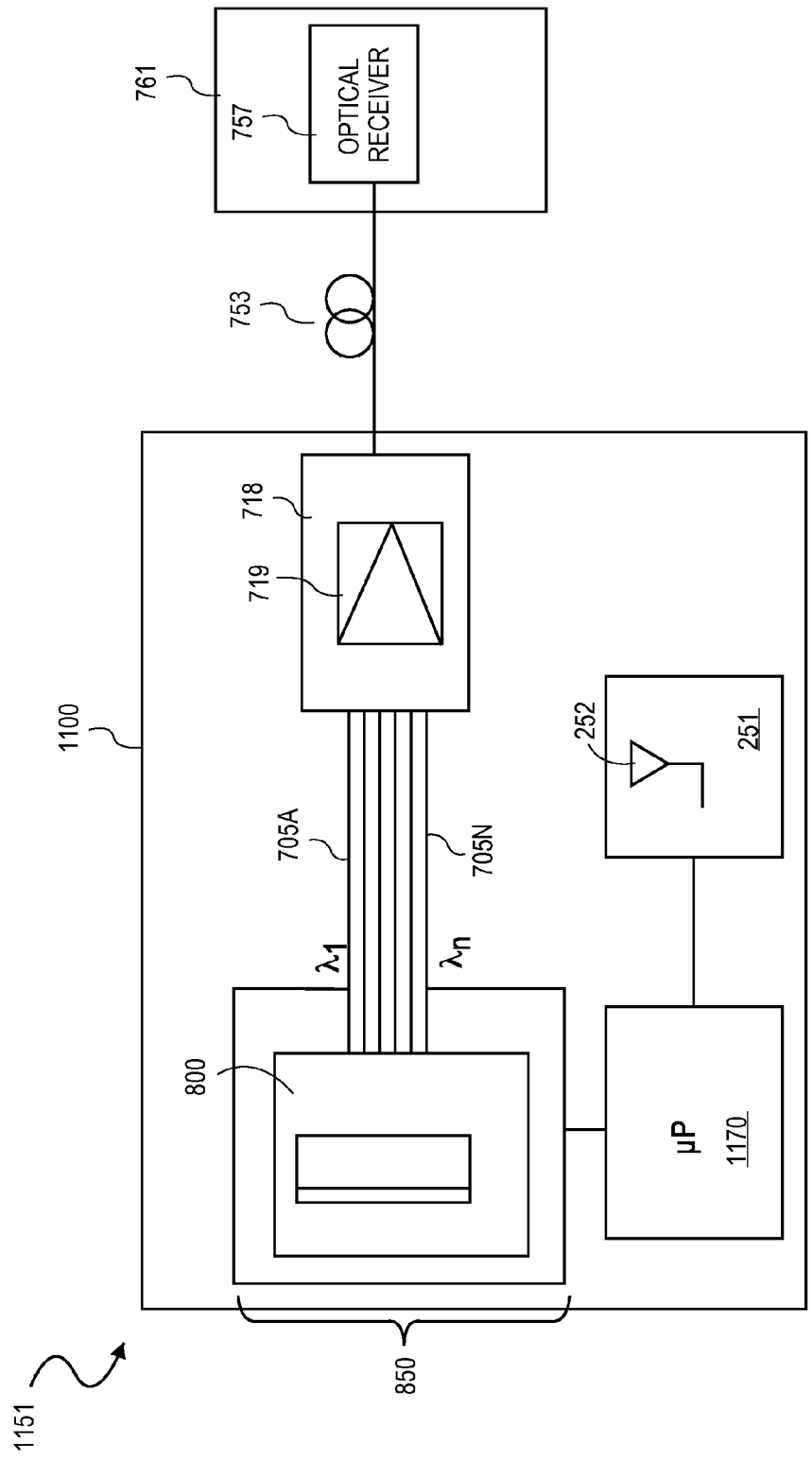
FIG. 11 is a plan view of a system employing an IOC chip with a vertically-coupled photonic device attached to an optical frame, in accordance with an embodiment.

FIG. 11 is a plan view of an optical system 1151 employing the photonic device assembly 850, in accordance with an embodiment. In the exemplary embodiment, a PCB 1100 includes a plurality of module assemblies (e.g., pluggable LGAs), a first being the photonic device assembly 850 including an IOC chip coupled to the package substrate 275 and the optical frame 800. Optically coupled to the IOC chip via the optical frame 800 is an optical demultiplexer module 718 including an optical multiplexer 719. The optical multiplexer 719 is fabricated on a substrate separate from the IOC chip of the photonic device assembly 850. The optical demultiplexer module 718 is further coupled to a single optical fiber 753 external to the PCB 1100 which, for example, connects to an optical receiver 757 at a remote location 761. Local optical interconnect on board the PCB 1100 is provided between the photonic device assembly 850 and optical demultiplexer module 718 with a plurality of optical fibers 705A through 705N. A second module, the wireless transceiver 251 including an antenna 252, is further coupled to the photonic device assembly 850 (e.g., through the microprocessor 1170) and, as such, the optical system 1151 may provide wireless-to-optical and optical-to-wireless transceiver functionality on a single platform.

As one illustrative embodiment, the PCB 1100 is disposed in a smart phone or tablet PC. The smart phone or tablet PC may be configurable perform wireless-to-optical and optical-to-wireless conversions and/or to independently conduct both wireless and optical communication, for example where the smart phone or tablet PC may be optically coupled to a display device through the optical coupling to the PCB 1100 to provide content (e.g., via streaming or other known protocols) to the display and also provide wireless communication functionality (e.g., via WiFi, Bluetooth, and similarly well-known protocols).

It is to be understood that the above description is intended to be illustrative, and not restrictive. For example, while the flow diagrams in the figures show a particular order of operations performed by certain embodiments of the invention, it should be understood that such order is not required (e.g., alternative embodiments may perform the operations in a different order, combine certain operations, overlap certain operations, etc.). Furthermore, many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. The scope of the invention should, therefore, be determined with reference to the appended claims, along with the full scope of equivalents to which such claims are entitled.

What is claimed is:

1. A method of forming a photonic device assembly, comprising:
   microfabricating a physical alignment feature in a chip substrate, the chip substrate comprising a monolithically integrated photonic device;
   joining a frame to the chip substrate by abutting a frame facet to a complementary facet of the physical alignment feature, the frame further to couple with an external optical lens or optical interconnect; and
   applying adhesive between the frame and to the chip substrate.

2. The method of claim 1, wherein microfabricating the physical alignment feature further comprises:
   etching or sawing a first and second feature at opposite ends of the chip substrate; and
   bifurcating the first and second features to singulate the chip substrate from adjacent chips, the singulated chip substrate having a sidewall facet from each of the first and second etched features disposed on opposing chip edges.

3. The method of claim 2, wherein the physical alignment feature is a v-groove formed in the chip substrate, the v-groove forming an angled edge surface of the chip substrate upon singulation.

4. The method of claim 2, wherein joining the frame facet to the physical alignment feature facet further comprises:
   laterally aligning the frame to the chip substrate by abutting first and second laterally opposing frame facets to the first and second sidewall facets on the edges of the chip substrate.

5. The method of claim 4, wherein joining the frame facet to the physical alignment feature facet further comprises vertically aligning the frame to the chip substrate by abutting a horizontal frame facet against a device surface of the chip substrate.

6. The method of claim 5, further comprising affixing the chip substrate to a package substrate to electrically couple the chip substrate to the package substrate,
   wherein the affixing further comprises overhanging the first and second sidewall facets beyond an edge of the package substrate.

7. The method of claim 1, wherein the adhesive is applied in clearances defined by the joined facets and as underfill between the chip substrate and a package substrate.

8. The method of claim 1, wherein the optical lens or optical interconnect further comprises an optical lens and the method further comprises aligning the lens to an alignment feature on the frame.

9. A photonic device assembly, comprising:
   a photonic device fabricated on a chip substrate, the photonic device chip having a physical alignment feature fabricated therein;
   a frame to couple an external optical interconnect to the photonic device, wherein the frame has a frame facet abutted to a facet of the physical alignment feature; and
   an adhesive to permanently affix the frame to the photonic device as aligned by the abutted facets.

10. The photonic device assembly of claim 9, wherein the physical alignment feature comprises first and second laterally opposing sidewall facets on opposing edges of the chip substrate, and wherein the frame facet comprises first and second laterally opposing frame facets mating with the first and second laterally opposing sidewall facets.

11. The photonic device assembly of claim 10, wherein the photonic device assembly further comprises a package substrate electrically coupled to the photonic device; and
    wherein the chip substrate is disposed on the package substrate with the first and second laterally opposing sidewall facets overhanging beyond an edge of the package substrate.

12. The photonic device assembly of claim 11, further comprising adhesive disposed in clearances defined by the joined facets and underfilling unsoldered interfaces between the chip substrate and the package substrate.

13. The photonic device assembly of claim 10, wherein the first and second laterally opposing sidewall facets are sloped away from a device layer of the chip substrate by between 30 and 60 degrees.

14. The photonic device assembly of claim 9, wherein the frame further comprises a facet abutting a device surface of the chip substrate;
    wherein the photonic device comprises a vertically coupled photonic device; and
    wherein the frame includes a lens routing optical transmissions between the vertically coupled photonic device and an external optical interconnect mounted to a surface of the frame non-parallel with the device surface.

15. The photonic device assembly of claim 9, wherein the frame further comprises a mechanical feature by which the external optical interconnect is aligned to at least one of a waveguide, a photodiode, or a laser fabricated in the photonic device.

16. The photonic device assembly of claim 9, wherein the chip substrate is single crystalline silicon and the frame is a plastic.

* * * * *

UNITED STATES PATENT AND TRADEMARK OFFICE
CERTIFICATE OF CORRECTION

PATENT NO. : 8,684,612 B2  
APPLICATION NO. : 13/175579  
DATED : April 1, 2014  
INVENTOR(S) : Kim Page 1 of 1

It is certified that error appears in the above-identified patent and that said Letters Patent is hereby corrected as shown below:

Please insert in column 1, line 5 before TECHNICAL FIELD:

--STATEMENT OF GOVERNMENT INTEREST

This invention was made with Government support under contract number H98230-08-3-0011 awarded by the Department of Defense. The Government has certain rights in this invention.--

Signed and Sealed this  
Third Day of November, 2015

Michelle K. Lee  
*Director of the United States Patent and Trademark Office*